W. H. ROST.
VALVE MECHANISM.
APPLICATION FILED JUNE 24, 1918.
1,362,743.
Patented Dec. 21, 1920.
3 SHEETS—SHEET 1.
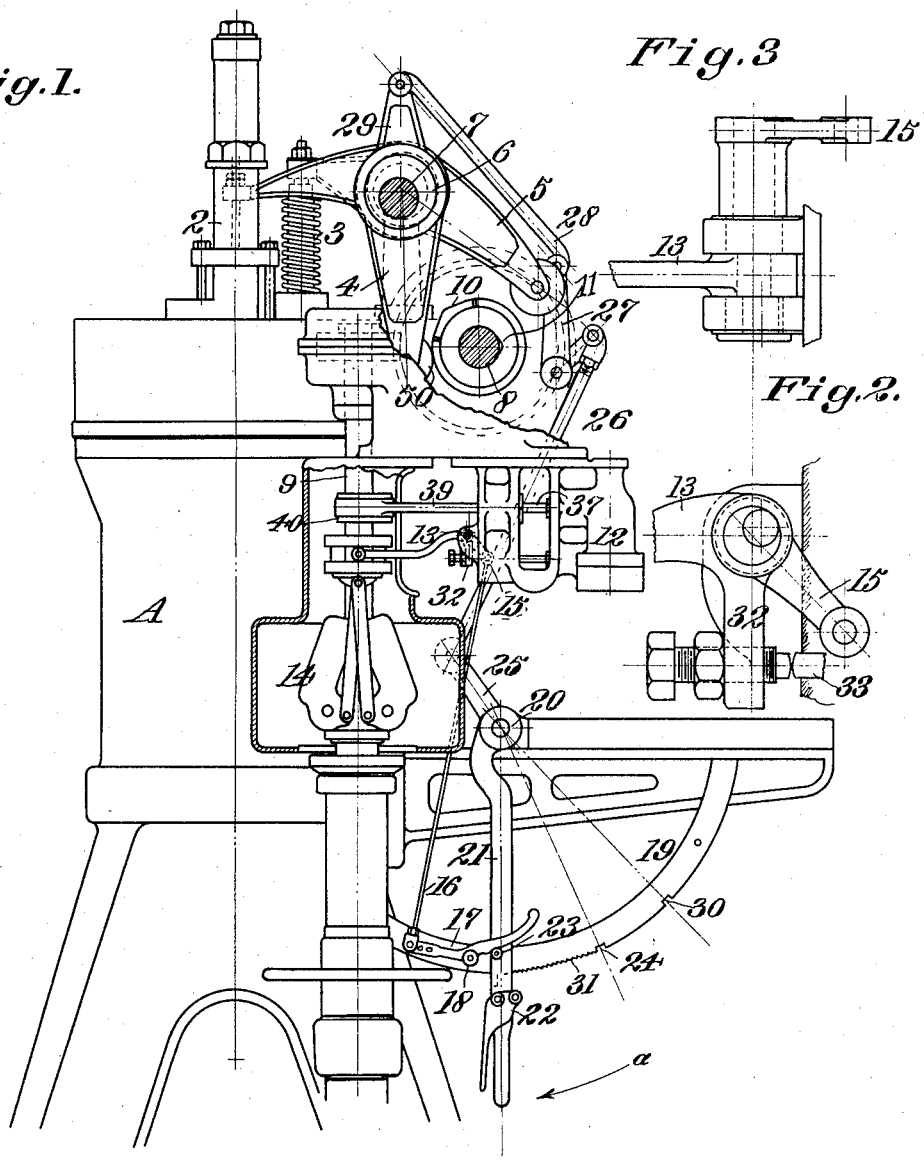
WITNESSES:
Charles Pickles
J.C. Benesch.
INVENTOR
William H. Rost
BY
Strong & Townsend
ATTORNEYS

W. H. ROST.
VALVE MECHANISM.
APPLICATION FILED JUNE 24, 1918.

1,362,743.

Patented Dec. 21, 1920.
3 SHEETS—SHEET 2.

WITNESSES:
Charles Rickles
J.C. Benesch

INVENTOR
William H. Rost
BY
Strong & Townsend
ATTORNEYS

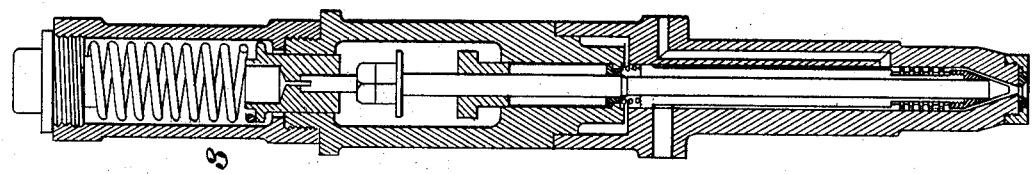
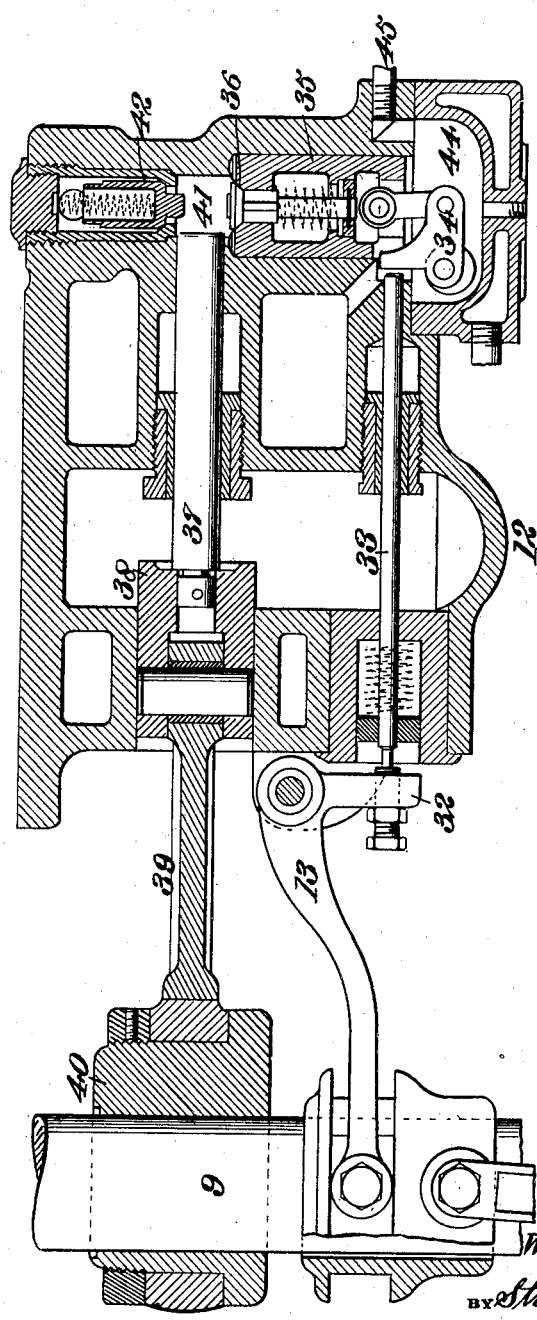

UNITED STATES PATENT OFFICE.

WILLIAM H. ROST, OF OAKLAND, CALIFORNIA.

VALVE MECHANISM.

1,362,743.  Specification of Letters Patent.  Patented Dec. 21, 1920.

Application filed June 24, 1918. Serial No. 241,482.

*To all whom it may concern:*

Be it known that I, WILLIAM H. ROST, a citizen of the United States, residing at Oakland, in the county of Alameda and State of California, have invented new and useful Improvements in Valve Mechanism, of which the following is a specification.

This invention relates to a valve controlling mechanism for internal combustion engines particularly of the "Diesel" type for regulating the volume of fuel oil and injection air and the time of admission of same.

One of the objects of the present invention is to provide means for regulating the volume of injection air so that it will always be proportional to the amount of fuel oil supplied, and particularly to eliminate the necessity of varying the air pressure in proportion to the load. Another object of the invention is to automatically close the fuel valves in unison with the interruption of the fuel oil supply when stopping or otherwise maneuvering the engine, thereby maintaining the required oil supply for immediate resumption of power. Another object of the invention is to regulate the time of fuel oil injection into the cylinder as the speed is varied, thereby obtaining the proper moment of combustion under all speed or load conditions, *i. e.*, to obtain the best working condition with maximum speed or load, and also avoiding excessive pressure on bearings or knocking caused by preignition at lower speeds. Further objects will hereinafter more fully appear.

The invention consists of the parts and the construction and combination of parts as hereinafter more fully described and claimed, having reference to the accompanying drawings, in which—

Figure 1 is an end view of a "Diesel" engine, partly broken away and partly in section, showing the application of the invention.

Fig. 2 is an enlarged detail view showing the connection between the governor and the fuel pump.

Fig. 3 is a plan view of Fig. 2.

Fig. 6 is a central, vertical, longitudinal section through the fuel pump.

Fig. 7 is a central, vertical section through the fuel valve.

Figure 4:
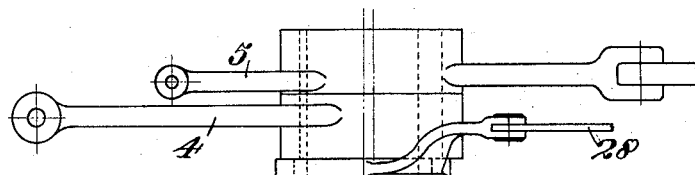
Fig. 4 is a plan view of Fig. 5.

Referring to the drawings in detail, A indicates the cylinder of an internal combustion engine of the "Diesel" type; 2 the fuel oil injecting valve; 3 the starting valve through which air under pressure is admitted when the engine is to be started; 4 the rocker arm operating the fuel oil injecting valve; 5 the rocker arm operating the starting valve; 6 an eccentric sleeve upon which the rocker arms are pivotally mounted; and 7 a shaft supporting the same.

Suitably journaled on one side of the engine is a cam shaft 8, which, in this instance, is driven through a governor shaft 9 at a ratio of one to two of the main crank shaft. 10 is a cam adapted to engage the rocker arm 4; 11 a cam adapted to engage the rocker arm 5; 12 a fuel pump from which oil under pressure is delivered to the fuel injecting valve 2; 13 a rocker arm connected with a governor 14 which automatically regulates the volume of oil discharged by the pump; and 15 a second rocker arm by which the fuel oil discharged by the pump may be manually regulated. This rocker arm is connected through a link 16 with a rocker arm 17 which is pivotally mounted, as at 18, on a rack bar 19. Pivotally mounted, as at 20, is an operating lever 21 which is provided with a grip-controlled latch 22 to permit the operating lever to be swung to any point on a radial line along the rack bar 19.

Secured on the operating lever is a pin 23 which is adapted to engage the underside of the arm 17 and rock the same into the position shown in Fig. 1 when the operating lever is swung over to full speed running position. Movement of the lever 21 to the main notch shown at 24 is transmitted through a crank arm 25 and a link 26 to a bell-crank 27, and from the bell-crank through a link 28 and crank arm 29 to the eccentric sleeve 6; that is, movement of the lever from the position shown to the main notch 24 is transmitted through the several links, bell-cranks and crank arms to turn the eccentric sleeve upon which the rocker arms 4 and 5 are mounted to a position where they will both be thrown out of engagement with the cams 10 and 11. Further movement of the operating lever to the notch 30 transmits a turning movement to 11 the eccentric sleeve which brings the rocker arm 5 into engagement with the cam 11, and as the rocker arm 5 operates the air starting valve 3, it can readily be seen that air is admitted to the cylinders to start the engine. The operating lever is, however, held in this position only a sufficient length of time to cause the engine to turn over at slow speed. The lever is then moved back beyond the stop notch 24 into engagement with the small ratchet teeth 31.

This movement of the operating lever reverses the position of the eccentric sleeve and thereby moves the rocker arm 5 out of engagement with the cam 11 and simultaneously swings the rocker arm 4 into engagement with the cam 10. The fuel oil injecting valve is, therefore, opened each time the cam shaft makes a revolution and a sufficient quantity of oil is admitted to operate the engine. The speed of the engine gradually increases as the operating lever is moved from the notch 24 to the position shown in Fig. 1, in which position the engine is supposed to be running at full speed and load. The opening of the fuel injecting valve gradually increases as the speed of the engine increases to permit a larger quantity of oil and injecting air to be admitted. The time of admission is also advanced as the speed increases to obtain the best working condition with maximum speed or load and also to avoid excessive pressure on the bearings or knocking caused by pre-ignition at slower speeds.

The fuel oil is admitted in the present instance through the valve 2 and it is injected and atomized by air under pressure in the usual manner. The injection air employed in connection with the fuel oil injecting valve is supplied by an air compressor of suitable construction (not here shown), and one important feature to be considered is that the injection air pressure always remains constant but the volume of injection air and fuel oil indicated is varied in proportion to the speed of the engine.

This is accomplished in the following manner: The moment the operating lever is moved from the main notch 24 over the rack bar in the direction of arrow $a$ a turning movement is transmitted to the eccentric sleeve 6 which brings the lower end of the rocker arm 4 into the path of travel of cam 10. In other words, the moment the operating lever has moved one or two notches beyond the main notch 24, contact is made between the point of the cam 10 and the rocker arm 4. The fuel injecting valve is, therefore, barely opened and the quantity of injecting air and oil admitted is so small that comparatively small pressure is produced during combustion of the charge. The engine can, therefore, only turn over at a slow speed. A gradual advance of the operating lever over the teeth 31 will, of course, gradually turn the eccentric sleeve 6 and will move the rocker arm 4 into a position where the cam 10 will engage it earlier during each revolution and also rock it to a greater extent. The quantity of fuel oil and injecting air admitted is gradually increased as the operating lever is moved forward over the ratchet teeth 31 and the speed of the engine will gradually increase and full speed will be obtained when the full line position shown in Fig. 1 is reached.

The pin 23, engaging with the arm 17, gradually swings the arm about the pivot 18 and pulls the link 16 and the arm 15 in a downward direction. This movement is transmitted through a crank arm 32 to a rod 33 and through the rod to a bell-crank 34 (see Fig. 6) which regulates the movement of a piston 35. This piston carries the intake valve 36 of the pump and, therefore, varies the quantity of oil discharged by the pump.

This will be more fully understood by the following description of the pump; 37 indicates the pump plunger; 38 a piston cross head; 39 a connecting rod; 40 an eccentric secured upon the governor shaft 9; 36 the intake valve; 41 the pump cylinder chamber; and 42 the discharging valve. The stroke of the plunger 37 remains constant under all conditions, but the capacity of the cylinder chamber 41 is varied to increase or decrease the quantiy of oil discharged through the valve 42. This is accomplished by providing the movable piston 35, and as the movement of the piston is controlled entirely by the position of the rod 33 and the bell-crank 34 the operation will be approximately as follows: The suction stroke of the plunger will permit oil to enter the cylinder chamber 41 by passing through a pipe 45, a chamber 44, the hollow piston 35 and the intake valve 36. The amount of oil discharged from the cylinder chamber through the valve 42 will, however, depend entirely upon the upward movement of the piston 35. In other words, regulation is effected during the upward travel of the compensating piston, the downward position being a fixed one, as the reverse movement of the plunger will exert sufficient pressure upon the oil delivered to the cylinder chamber to force the piston 35 downwardly a fixed distance. The remaining oil, after said downward movement has been checked, will then discharge through the valve 42 and pass through the fuel line up into the fuel oil injecting valve 2. The quantity of oil admitted under all conditions is, therefore, controlled from the operating lever 21 which regulates the position of the arm 17, crank arm 32 and the stop rod 33, and as the injecting air admitted to the fuel intake valve 2 always remains at constant pressure, it can readily be seen that the quantity of oil and injecting air admitted is proportional to speed and load.

While the fuel pump forms a necessary element of the present combination, it will only be referred to in the accompanying claims as means for regulating the quantity of fuel oil delivered to the fuel injecting valve. A separate application containing a more complete description of the fuel oil pump will be filed simultaneously with the present application.

The amount of oil delivered to the fuel injecting valve, as previously stated, is regulated by automatically increasing or decreasing the capacity of the cylinder chamber 41. This is accomplished by the movement of the operating lever to a point where it engages the arm 17. However it may be accomplished by the governor 14, that is, the operating lever may be moved to the full line position shown in Fig. 1 but variations in load upon the engine are automatically taken care of by the governor 14 through the connecting arm 13 which is also adapted to rock the crank arm 32 which, as previously stated, automatically regulates the movement of piston 35 to vary the amount of oil admitted.

Figure 5:
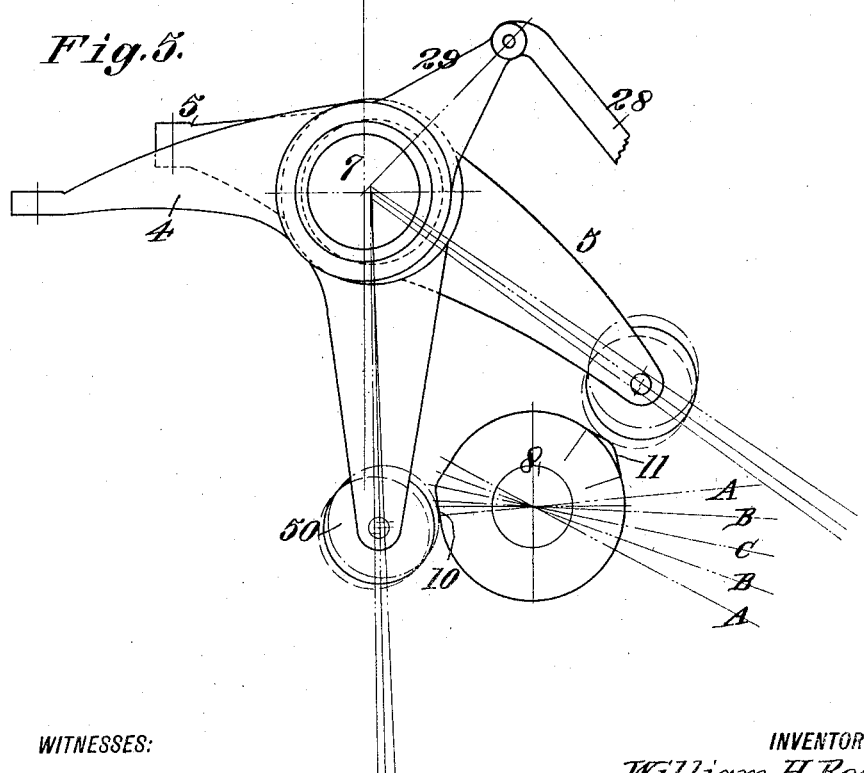
Fig. 5 is a diagrammatic side elevation of the rocker arms and the cams operating same.

The time of admission of the fuel oil through the fuel injecting valve 2 can best be described by referring to Fig. 5. The opening or lift of said valve can also be better explained by referring to this figure. The length of the cam 11 is indicated by the dot and dash lines A—A. The roller 50, mounted on the lower end of the rocker arm 4, engages the cam 10 from the points indicated by said lines when the engine is running under full load and speed. The time of admission is, therefore, advanced to its extreme position, the lift of the valve is in this position greatest, and the amount of injecting air and the fuel admitted is also greatest. Turning of the eccentric sleeve through the controlling lever 21, however, changes the position of the rocker arm 4 and the contact of the roller 50 with the cam, for instance at half speed, is indicated by the dot and dash lines marked "B—B." The time of admission is at this point retarded and the opening of the fuel injecting valve is lessened as the roller is not engaged by the cam except while the surface, indicated by the lines B—B, is passed. Any lessening of speed beyond half of course further decreases the lift and retards the time of admission and any increase beyond half speed advances the time of admission and also increases the lift of the valve or the quantity of injecting air and fuel oil admitted.

The whole operation of fuel admission, that is, as regards the amount admitted and the time of admission, is, therefore, manually controlled by swinging the main operating lever from the stop position to the full speed position shown. The rocker arms 4 and 5 are also moved into and out of engagement with their respective cams through the connection made between the operating lever and the eccentric sleeve, thereby positively insuring engagement of one set of cams and rocker arms when the lever is moved to air starting position and positive engagement of the second set of cams and rocker arms when fuel injection is required. The connection formed between the fuel pump and the governor will at the same time automatically take care of the quantity of oil delivered to the fuel injecting valve, if the load increases or decreases, when the operating lever is moved into the full speed position shown.

The whole mechanism provided for accomplishing the different results described is simple and substantial in construction and may be easily applied to practically any form of "Diesel" engine now employed, and as all operations are controlled by a single lever it can readily be seen that practically anyone, whether skilled or unskilled, can accomplish the operation of starting and maneuvering the engine under all conditions.

I wish it understood that various changes in form, proportions, and minor details of construction may be resorted to within the scope of the appended claims and that I do not wish to limit myself to the specific design and construction here shown.

Having thus described my invention, what I claim and desire to secure by Letters Patent is—

1. The combination with the fuel oil injecting valve on a Diesel engine, of a single means for maintaining a parity between the engine speed, the amount of fuel oil and air injected and the time of injection, and means operable independently of said means for varying the amount of fuel oil delivered to the fuel oil injecting valve.

2. The combination with a fuel oil injecting valve and an air starting valve on a Diesel engine, of a pair of rocker arms adapted to open and close said valves, a cam shaft, a pair of cams on said shaft engageable one with each rocker arm, and means for swinging the rocker arms into and out of engagement with their respective cams.

3. The combination with a fuel oil injecting valve and an air starting valve on a Diesel engine, of a pair of rocker arms adapted to open and close said valves, a cam shaft, a pair of cams on said shaft engageable one with each rocker arm, and a single means for swinging the rocker arms into and out of engagement with their respective cams.

4. The combination with a fuel oil injecting valve and an air starting valve on a Diesel engine, of a pair of rocker arms adapted to open and close said valves, a cam shaft, a pair of cams on said shaft engageable one with each rocker arm, an eccentric sleeve on which the rocker arms are pivotally mounted, and means for turning said sleeve to move the rocker arms into and out of the path of travel of their respective cams.

5. The combination with a fuel oil injecting valve and an air starting valve on a Diesel engine, of a pair of rocker arms adapted to open and close said valves, a cam shaft, a pair of cams on said shaft engageable one with each rocker arm, an eccentric sleeve on which the rocker arms are pivotally mounted, a controlling lever, and a link connection between the controlling lever and the eccentric sleeve whereby movement of the lever is transmitted to turn the sleeve to move the rocker arms into and out of the path of travel of their respective cams.

6. The combination with a fuel oil injecting valve and an air starting valve on a Diesel engine, of a pair of rocker arms adapted to open and close said valves, a cam shaft, a pair of cams on said shaft engageable one with each rocker arm, an eccentric sleeve on which the rocker arms are pivotally mounted, a controlling lever, a link connection between the controlling lever and the eccentric sleeve whereby movement of the lever is transmitted to turn the sleeve to move the rocker arms into and out of the path of travel of their respective cams, a fuel oil pump for delivering oil to the injection valve, and means controlled by movement of the controlling lever for regulating the amount of oil discharged by the pump and delivered to the injection valve.

7. The combination with the fuel injecting valve and the air starting valve on a Diesel engine, of a pair of rocker arms, one engageable with each valve, a shaft supporting said rocker arms, a sleeve eccentrically mounted on the shaft upon which the rocker arms are pivotally mounted, a cam shaft, a pair of cams on said shaft, one engageable with the rocker arm that actuates the fuel injecting valve, and one engageable with the rocker arm which actuates the air starting valve, and means for turning the eccentric sleeve to move either of the rocking arms out of engagement with the cams on the cam shaft or both arms out of engagement with the cams on the cam shaft, or either arm into position where it will engage its coöperating cam on the cam shaft.

8. The combination with the fuel injecting valve and the air starting valve on a Diesel engine, of a pair of rocker arms, one engageable with each valve, a cam shaft whereby said rocker arms are actuated, and means for moving either or both rocker arms into or out of engagement with the cam shaft.

9. The combination with the fuel injecting valve and the air starting valve on a Diesel engine, of a pair of rocker arms, one engageable with each valve, a cam shaft whereby each arm is actuated, a fuel pump for delivering fuel oil to the fuel injecting valve, means for regulating the quantity of oil delivered by the fuel pump, and means actuated by said means and simultaneous therewith for moving both or either rocker arms into or out of engagement with the cam shaft.

In testimony whereof I have hereunto set my hand in the presence of two subscribing witnesses.

WILLIAM H. ROST.

Witnesses:
JOHN H. HERRING,
W. W. HEALEY.